United States Patent [19]

Hüber

[11] 4,120,544

[45] Oct. 17, 1978

[54] SELF-PRESSURIZING RADIAL FRICTION BEARING

[75] Inventor: Wolfgang Hüber, Schweinfurt, Fed. Rep. of Germany

[73] Assignee: SKF Kugellagerfabriken GmbH, Schweinfurt, Fed. Rep. of Germany

[21] Appl. No.: 795,934

[22] Filed: May 11, 1977

[30] Foreign Application Priority Data

Jun. 3, 1976 [DE] Fed. Rep. of Germany ....... 2624849

[51] Int. Cl.² .................. F16C 32/06; F16C 17/02
[52] U.S. Cl. .................................. 308/240; 308/100; 308/108; 308/122
[58] Field of Search .............. 308/9, 97, 98, 100, 308/108, 121, 122, 240; 184/5

[56] References Cited

U.S. PATENT DOCUMENTS

| 649,302 | 5/1900 | Hardy | 308/240 |
| 4,007,974 | 2/1977 | Huber | 308/122 |

Primary Examiner—Trygve M. Blix
Assistant Examiner—Charles E. Frankfort
Attorney, Agent, or Firm—Daniel M. Rosen

[57] ABSTRACT

The present invention relates to a self-pressuring radial friction bearing for both directions of rotation of a shaft; the bore surface of the bearing has pumping grooves that are inclined to the circumferential direction, and communicate via one of their ends with a space supplied with lubricant.

12 Claims, 4 Drawing Figures

SELF-PRESSURIZING RADIAL FRICTION BEARING

BACKGROUND OF THE INVENTION

There are certain known self-pressurizing radial friction bearings which have on the bore surface grooves which are alternately inclined to the circumferential direction, and these grooves communicate with one another by means of connecting grooves running in the circumferential direction as disclosed in the U.S. Pat. No. 2,598,476. Such radial friction bearings have the disadvantage that the dynamic pumping action of the grooves, inclined at an angle to the circumferential direction, is disturbed by the connecting grooves, so that a relatively small and in many cases insufficient bearing capacity is present.

It is an object of the invention to provide an improved radial friction bearing of the stated kind, which has a large dynamic bearing capacity for the two directions of rotation and which at the same time can be produced economically.

SUMMARY OF THE INVENTION

The above-noted objectives have been accomplished in accordance with the invention as follows. The bearing surface, which is provided with grooves, is subdivided in the circumferential direction into several partial surfaces, each of which has a flute or groove running in axial direction, starting from a space supplied with lubricant, and other pumping grooves which build up pressure and which are on both sides of this flute opposite to one another and inclined at an angle to the circumferential direction. As the shaft turns in one or the other direction, the pumping grooves on one side of each axial flute act dynamically, to produce pressure, while the pumping grooves on the opposite side of the same flute produce only a slightly reduced pressure which does not impair the dynamic carrying capacity of the radial friction bearing.

According to one embodiment of the invention, the individual partial surfaces are separated from one another in the circumferential direction by choke or valve surfaces which limit flow of the lubricant. By such means, the lubricant is pumped dynamically from the pressure producing grooves on one side of the axial flute against the respective choke surface, so that a large bearing carrying capacity results.

According to a further embodiment of the invention, the space supplied with lubricant connects directly to at least one of the two lateral ends of the radial friction bearing or to a space formed by an annular groove defined in the bore or bearing surface.

According to another embodiment, the pumping grooves are subdivided into two groups, separated by a radial plane or by the annular groove; the slope or inclination of one group is the mirror image of the inclination of the other group on the opposite side of the plane. With this arrangement the pumping grooves of the two groups will tend to converge from their respective axial flutes toward the radial plane. As the shaft turns, the lubricant, which may be a gas or a liquid, is then pumped in the one or the other direction from the lubricant-supplied space on both sides, axially into the bearing, so that the radial friction bearing has a high load-bearing capacity.

In accordance with the invention, the pumping grooves of the two groups can also diverge from their respective axial grooves to the annular groove. In this case, as the shaft turns, gaseous or liquid lubricant is pumped in one or the other direction from the lubricant supplied annular groove to the lateral ends of the radial friction bearing.

According to an additional characteristic of the invention, the grooves at the lateral end of the radial friction bearing are bounded by an annular choke or flow-limiting surface. The bearing surfaces of the bearing bore and shaft which slide on one another, can optionally be curved cylindrically, conically, double conically or spherically. For achieving a high, dynamic bearing capacity, the grooves can also run spirally.

Preferred embodiments of the invention will now be described in greater detail, with reference to two examples illustrated in drawings described below.

DETAILED DESCRIPTION OF THE PREFERRED EMBODIMENTS

Figure 1:
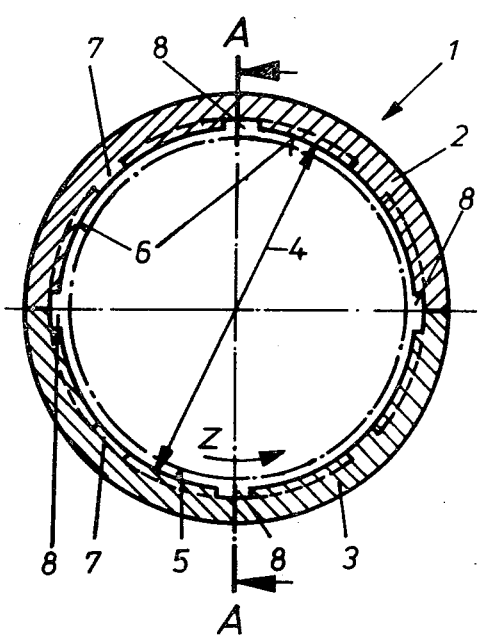
FIG. 1 shows a cross section view of a radial friction bearing of the new invention.
Figure 2:
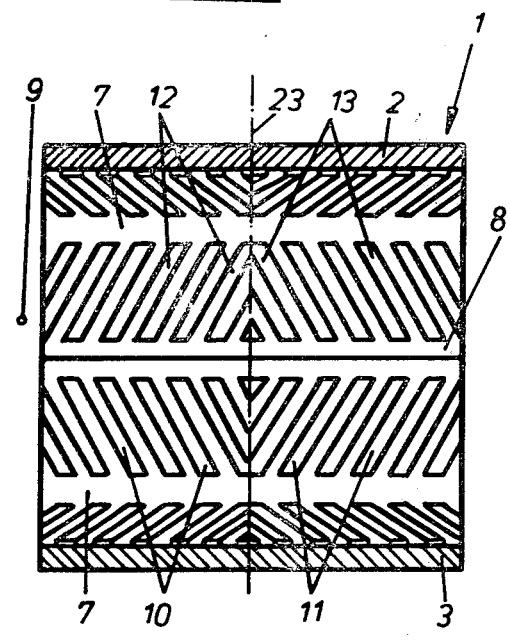
FIG. 2 shows a longitudinal section view taken along line A—A through FIG. 1.

In FIGS. 1 and 2 the new radial friction bearing labeled 1 is constructed as an axially divided sleeve which is held, for example, in the bore of a housing (not shown) and therefore consists of the upper bearing part 2 and the lower bearing part 3. By lifting the upper bearing part 2, the rotor with shaft 5 will be exposed and can be lifted up and off the lower bearing part 3, thus facilitating assembly and disassembly of the radial friction bearing. Moreover, in comparison to a one-piece sleeve, the bore surface 4 of bearing parts 2 and 3 can more readily be processed, for example, in electro-chemical processing procedures, since this surface is more readily accessible. The essentially cylindrical bore surface 4 of the radial friction bearing 1 is in sliding engagement with the adjacent surface of a cylindrical shaft 5 (drawn with a line of alternating dots and dashes in FIG. 1). This bore surface 4 comprises four partial bore surfaces 6 spaced around the circumference, which are separated from one another by choke or flow limiting surfaces 7. Each partial surface 6 has a flute 8, which runs in the axial direction directly to the lubricant-supply space 9, at both lateral ends of the radial friction bearing. On both sides of this flute 8, pressure building or pumping grooves 10, 11, 12 and 13 are provided in the partial surface 6, in herringbone fashion opposite to one another and inclined at an angle to the circumferential direction. The grooves 10, 11, 12 and 13 of each partial surface 6 are subdivided into two groups by the radial plane 23; grooves 10 for example, on one side of this plane, are aligned at a given angle, and grooves 11 are aligned oppositely as a mirror image across this plane, and moreover, in such a manner that the grooves 10 and 11, and similarly grooves 12 and 13 converge from their respective flutes 8 to the radial plane.

As the cylindrical shaft 5 turns in the direction indicated by arrow Z in FIG. 1, the pumping grooves 10 and 11 of the radial friction bearing produce a dynamic effect and pump the lubricant from the lubricant-supply space 9 directly or via flute 8, axially into the interior of the bearing 1 and against the choke or flow-limiting surfaces 7, so that a dynamic pressure of the lubricant arises that maintains a load-bearing lubricant film between the bore surface 4 and the shaft 5. At the same time, in grooves 12 and 13, which are inclined in the opposite manner to the circumferential direction, a slightly reduced pressure is produced which cannot be less than the vapor pressure of the lubricant, for example, oil.

If shaft 5 turns in the direction which is the opposite to that indicated by arrow Z in FIG. 1, then pumping grooves 12 and 13 become dynamically effective in that they pump the lubricant axially into the interior of the radial friction bearing and against the choke surfaces 7, so that again a loadbearing lubricant film is produced between the bore surface 4 and the shaft 5, while only a slightly reduced pressure results from grooves 10 and 11.

Figure 3:
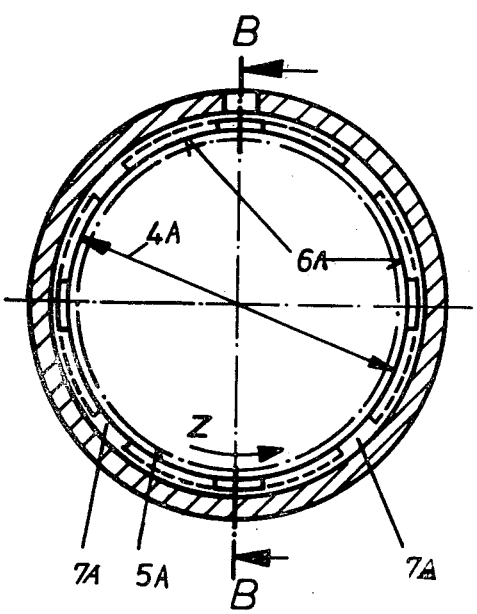
FIG. 3 shows a cross section view of a modified radial friction bearing of the new invention.
Figure 4:
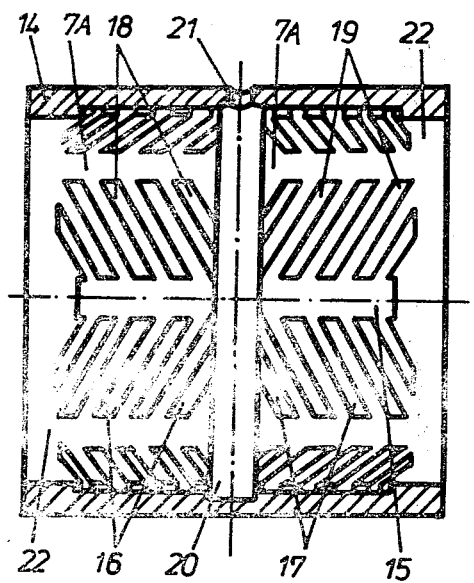
FIG. 4 shows a longitudinal section view taken along line B—B through FIG. 3.

A modified embodiment of the new radial friction bearing is shown in FIGS. 3 and 4. This bearing is made as a one-piece sleeve, whose bore surface 4A receives cylindrical shaft 5A (drawn as a line of alternating dots and dashes in FIG. 3) as in the previously described version. The bore surface 4A is also subdivided into four partial surfaces 6A, which are separated from one another in circumferential direction by choke surfaces 7. Each partial surface 6A has an axially running flute 15 as well as pressure building grooves 16, 17, 18 and 19 which are in herringbone arrangement on both sides of this flute 15 and are inclined at an angle to the circumferential direction. An annular groove 20 is defined in the bore surface 4A in the center between the two lateral ends of the radial friction bearing 14. Grooves 16, 17, 18 and 19 of each partial surface 6A are subdivided into two groups which are separated by the annular groove 20 with a slope that forms the mirror image to this annular groove. At the same time, grooves 16, 17, 18 and 19 of both groups diverge from the respective axial flute 15 away from the annular groove 20. The annular groove 20 is supplied with lubricant through a radial supply channel 21 which is bored into the radial friction bearing 14. In other respects, pumping grooves 16, 17, 18 and 19 are bounded at both lateral ends of the bearing by an annular choke or flow-limiting surface 22.

The mode of operation of the modified radial friction bearing is analogous to that of the previously described radial friction bearing, as follows; as shaft 5A turns in the direction indicated by arrow Z in FIG. 3, grooves 16 and 17 pump the lubricant from the lubricant-supplied annular groove 20 directly or via flute 15 axially to the annular choke surfaces 22, and in circumferential direction to the choke surfaces 7A, which are between the partial surfaces 6A. By these means, a dynamic load-bearing lubricant film is created between the bore surface 4 and the shaft 5A.

As the shaft 5A turns in the direction that is the opposite to that indicated by arrow Z in FIG. 3, grooves 18 and 19 become active and produce a dynamic load-bearing lubricant film in the radial friction bearing 14.

The present invention is obviously not limited to the two examples described in the preceding, but can be modified extensively within the cope of the inventive concept. Furthermore, the pumping grooves need not be defined in the bore surface, but may instead be provided in the shaft; with this arrangement the lubricant-supply space, such as an annular groove in the shaft, can be supplied with lubricant through axial and radial passages in the shaft.

What we claim is:

1. In a self-pressuring radial bearing including a sleeve operable with a rotatable shaft and a quantity of fluid lubricant from a lubricant supply space, the sleeve bore and shaft circumference comprising adjacent bearing surfaces respectively in sliding engagement, and the bearing including in a first of said bearing surfaces a plurality of pumping grooves oriented at acute angles to the axis of the bearing, the improvement in combination therewith wherein said first bearing surface has defined therein a plurality of axial flutes spaced circumferentially and communicating with said lubricant supply space, a plurality of said pumping grooves are distributed on each side of each flute, each pumping groove having an open end communicating with said flute and an opposite closed end spaced in the circumferential direction from the open end, whereby lubricant is pressurized in those pumping grooves whose closed end relative to the open end is in the direction of rotation of the second of said bearing surfaces relative to the first of said surfaces.

2. A bearing according to claim 1 wherein said sleeve bore and shaft circumference comprise said first and second bearing surfaces respectively.

3. A bearing according to claim 1 wherein said pumping grooves on each side of each flute include some grooves inclined according to a right hand screw thread and others inclined according to a left hand screw thread.

4. A bearing according to claim 3 wherein said pumping grooves on each side of each flute define a herringbone alignment pattern.

5. A bearing according to claim 1 wherein the bearing surfaces have length defined by opposite ends, and wherein said lubricant supply space is formed as an annular groove in said first bearing surface and intermediate the ends thereof, said annular groove being in communication with said flutes.

6. A bearing according to claim 1 wherein each flute and the pumping grooves on both sides of said flute comprise a groove pattern, and said first bearing surface comprises at least two of said patterns circumferentially spaced apart with a choke portion of said first bearing surface defined between said patterns, said choke portion slidably engaging said second bearing surface for preventing lubricant flow out of adjacent pumping grooves.

7. A bearing according to claim 1 wherein said bearing surfaces are curved cylindrically.

8. In a self-pressuring radial bearing including a sleeve operable with a rotatable shaft and a quantity of fluid lubricant from a lubricant supply space, the sleeve bore and shaft circumference comprising two adjacent cylindrical bearing surfaces in sliding engagement, and the bearing including in a first of said surfaces a plurality of pumping grooves oriented at cute angles to the axis of the bearing, the improvement in combination therewith wherein said first bearing surface has defined therein at least one axial flute communicating with said lubricant supply space, said first bearing surface comprises at least one pair of first and second areas separated by said flute, said pumping grooves are distributed in each area in first and second groups respectively oriented according to right and left hand screw threads, and each pumping groove has one open end communicating with said flute and an opposite closed end circumferentially spaced from said open end, whereby lubricant becomes pressurized during relative rotation of the shaft in either direction, in those pumping grooves where lubricant is driven toward the closed ends by relative movement of a portion of the second bearing surface adjacent such pumping grooves in a circumferential direction toward the closed ends thereof.

9. A bearing according to claim 8 wherein said sleeve bore and shaft circumference comprise said first and second bearing surfaces respectively.

10. A bearing according to claim 8 wherein said pumping grooves in each of said areas define a herringbone design.

11. A bearing according to claim 8 wherein, in each of said areas, the pumping grooves in said first group define an alignement pattern and said pumping grooves in said second group define a mirror image of said alignment pattern.

12. A bearing according to claim 8 wherein, in the first of said areas the pumping grooves in the first and second groups respectively converge toward said flute, and in the second area the pumping grooves in the first and second groups respectively diverge from said flute.

* * * * *

UNITED STATES PATENT AND TRADEMARK OFFICE
CERTIFICATE OF CORRECTION

PATENT NO. : 4,120,544
DATED : October 17, 1978
INVENTOR(S) : Wolfgang Huber

It is certified that error appears in the above-identified patent and that said Letters Patent are hereby corrected as shown below:

Column three, line 62; Change "cope" to --scope--.

Column four, line 56; Change "cute" to --acute--.

Signed and Sealed this

Twelfth Day of June 1979

[SEAL]

Attest:

RUTH C. MASON
*Attesting Officer*

DONALD W. BANNER
*Commissioner of Patents and Trademarks*